(12) United States Patent  
Pillers, II

(10) Patent No.: US 7,832,495 B2  
(45) Date of Patent: Nov. 16, 2010

(54) TOOL RETENTION APPARATUS AND METHOD

(75) Inventor: Lauritz Phillip Pillers, II, Shorewood, IL (US)

(73) Assignee: Caterpillar Inc, Peoria, IL (US)

( * ) Notice: Subject to any disclaimer, the term of this patent is extended or adjusted under 35 U.S.C. 154(b) by 40 days.

(21) Appl. No.: 12/232,970

(22) Filed: Sep. 26, 2008

(65) Prior Publication Data

US 2009/0071669 A1    Mar. 19, 2009

Related U.S. Application Data

(63) Continuation of application No. 11/452,381, filed on Jun. 14, 2006, now Pat. No. 7,438,139.

(30) Foreign Application Priority Data

Jun. 15, 2005    (EP) .................................. 05253700

(51) Int. Cl.  
*B25D 17/08* (2006.01)
(52) U.S. Cl. ............................ 173/1; 173/29; 173/128; 173/132; 279/19.3; 279/93
(58) Field of Classification Search .................. 173/29, 173/132, 128, 104, 1; 279/91, 19.3, 19.6, 279/89, 19.5, 93; 403/348, 375  
See application file for complete search history.

(56) References Cited

U.S. PATENT DOCUMENTS

| | | |
|---|---|---|
| 1,331,353 A | 2/1920 | Nurnberger |
| 1,699,870 A | 1/1929 | Samuel et al. |
| 1,866,863 A | 5/1929 | Richardson |
| 1,865,637 A | 7/1932 | Lear |

(Continued)

FOREIGN PATENT DOCUMENTS

DE    613 109    5/1935

(Continued)

OTHER PUBLICATIONS

European Search Report, and Non-binding Opinion for Application No. 05253700.8, dated Nov. 15, 2005 (9 pages).

(Continued)

*Primary Examiner*—Scott A. Smith  
(74) *Attorney, Agent, or Firm*—Finnegan, Henderson, Farabow, Garrett & Dunner LLC

(57) ABSTRACT

A tool assembly provided with a housing defining a chamber, and a reciprocating work tool arranged in the chamber, is disclosed. A tool retention member has an aperture through which the work tool extends. Engaging structure including mutually engaging protrusions on the housing and the tool retention member is configured to permit engagement of the tool retention member with the housing by relative rotation of the tool retention member and the housing. Retention structure on the work tool is configured to prevent removal of the work tool from the housing when the tool retention member is engaged with the housing. A locking structure is configured to lock the tool retention member and housing against relative rotation. A prestressing structure is located between the protrusions on the housing and a portion of the tool retention member and is configured to urge the tool retention member away from the housing.

20 Claims, 3 Drawing Sheets

U.S. PATENT DOCUMENTS

| | | | |
|---|---|---|---|
| 2,220,195 A | 11/1940 | Amundsen |
| 2,231,496 A | 2/1941 | Fuehrer |
| 2,236,122 A | 3/1941 | Tuttle |
| 2,237,875 A | 4/1941 | Frederick |
| 2,837,341 A | 6/1958 | Swanson |
| 3,003,773 A | 10/1961 | Fuehrer |
| 3,458,210 A | 7/1969 | Whitehouse |
| 3,724,237 A | 4/1973 | Wood |
| 3,730,281 A | 5/1973 | Wood |
| 3,972,376 A | 8/1976 | Price |
| 4,491,445 A | 1/1985 | Hunger et al. |
| 4,545,440 A | 10/1985 | Treadway |
| 4,573,839 A | 3/1986 | Finnegan |
| 4,632,195 A | 12/1986 | Emmerich |
| 5,125,462 A | 6/1992 | Hesse |
| 5,211,693 A | 5/1993 | Pacher |
| 5,320,187 A | 6/1994 | Pressley et al. |
| 5,350,025 A | 9/1994 | Campbell et al. |
| 5,401,066 A | 3/1995 | Remsburg |
| 5,522,606 A | 6/1996 | Pressley et al. |
| 5,667,228 A | 9/1997 | Fabris |
| 5,896,934 A | 4/1999 | Yaniero et al. |
| 5,944,120 A | 8/1999 | Barden |
| 5,971,403 A | 10/1999 | Yahagi et al. |
| 6,033,168 A | 3/2000 | Creely et al. |
| 6,056,070 A | 5/2000 | Shinohara et al. |
| 6,092,814 A | 7/2000 | Kageler |
| 6,328,116 B1 | 12/2001 | Hurskainen et al. |
| 6,491,111 B1 | 12/2002 | Livingston et al. |
| 6,497,418 B2 | 12/2002 | Yahagi |
| 6,510,904 B1 | 1/2003 | Tyrrell |
| 6,543,204 B2 | 4/2003 | Gruson |
| 6,543,789 B2 | 4/2003 | Frenzel et al. |
| 7,438,139 B2 * | 10/2008 | Pillers, II .................... 173/132 |
| 2006/0283612 A1 | 12/2006 | Pillers |
| 2006/0283615 A1 | 12/2006 | Pillers et al. |

FOREIGN PATENT DOCUMENTS

| | | |
|---|---|---|
| DE | 2 244 769 | 3/1974 |
| DE | 38 09 527 | 10/1988 |
| FR | 981770 | 5/1951 |
| FR | 1 447 933 | 6/1966 |
| GB | 332342 | 7/1930 |
| GB | 344689 | 3/1931 |
| GB | 713196 | 8/1954 |
| GB | 810464 | 3/1959 |
| GB | 2228703 | 9/1990 |

OTHER PUBLICATIONS

European Search Report, and Non-binding Opinion for Application No. 05253698.4, dated Jan. 30, 2006 (10 pages).

Office Action issued Feb. 26, 2008, in U.S. Appl. No. 11/452,324 (9 pages).

RCE with Submission filed Apr. 10, 2008, in U.S. Appl. No. 11/452,324 (19 pages).

* cited by examiner

TOOL RETENTION APPARATUS AND METHOD

This a continuation of U.S. application Ser. No. 11/452,381, filed Jun. 14, 2006, now U.S. Pat. No. 7,438,139, and claims the priority benefit of European Patent Application No. 05253700.8, filed Jun. 15, 2005. The entire contents of U.S. application Ser. No. 11/452,381 are hereby incorporated by reference.

TECHNICAL FIELD

The present disclosure relates generally to a tool assembly having a removable tool, and more specifically to a hydraulic or pneumatic hammer assembly having a removable work tool.

BACKGROUND

Hydraulic hammers are used on work sites to break up large hard objects before such objects can be moved away. Hydraulic hammers may be mounted to back hoes or excavators, or may be hand-held. Typically, the hammer assembly is powered by either a hydraulic or pneumatic pressure source. During a work or power stroke, high fluid pressure is applied to a first shoulder of a piston, thereby driving the piston in a forward direction. The piston then strikes a work tool, which is driven in the forward direction thereby causing a work tip of the work tool to strike the rock, concrete, asphalt or other hard object to be broken up. During a return stroke, fluid pressure is applied to a second shoulder of the piston in order to return the piston to its original position.

The work tool is retained within a sleeve, commonly referred to as a front head. Conventionally a tool retention pin is used to retain the work tool within the front head. The pin extends across one side of the front head and engages with a transverse machined groove in the work tool. The height of the groove is greater than the diameter of the pin, thereby allowing reciprocal forward and backward movement of the hammer over a limited range of movement. The pin and groove are subject to burring in use, because of the repeated impact. Upon servicing it is necessary to remove the pin before the tool can be removed from the front head. The burring must then be removed before the pin or tool can be replaced in the front head. Moreover, the tool is restrained from rotation by the pin, so unwanted torque can be transferred from the tool to the tool assembly and the machine to which it is mounted.

At least some of the disclosed embodiments may overcome one or more of the abovementioned drawbacks.

SUMMARY OF THE INVENTION

In accordance with a first aspect of the present disclosure, there is provided a tool assembly comprising a housing defining a chamber, a reciprocating work tool arranged in the chamber, and a tool retention member having an aperture through which the work tool extends. The housing includes engaging structure which permits the engagement of the tool retention member with the housing by relative rotation of the tool retention member and housing. The work tool is provided with retention structure which prevents the removal of the work tool from the housing when the tool retention member is engaged with the housing.

In accordance with a second aspect of the present disclosure, there is provided a method of installing a work tool in a tool assembly, comprising: providing a tool assembly having a housing defining a chamber and a tool retention member having an aperture; inserting a work tool in the aperture of the tool retention member; engaging the tool retention member and the housing by relative rotation of the tool retention member and housing, thereby securing the work tool for reciprocating movement within the chamber, and locking the tool retention member and housing against relative rotation.

DETAILED DESCRIPTION

Figure 1:
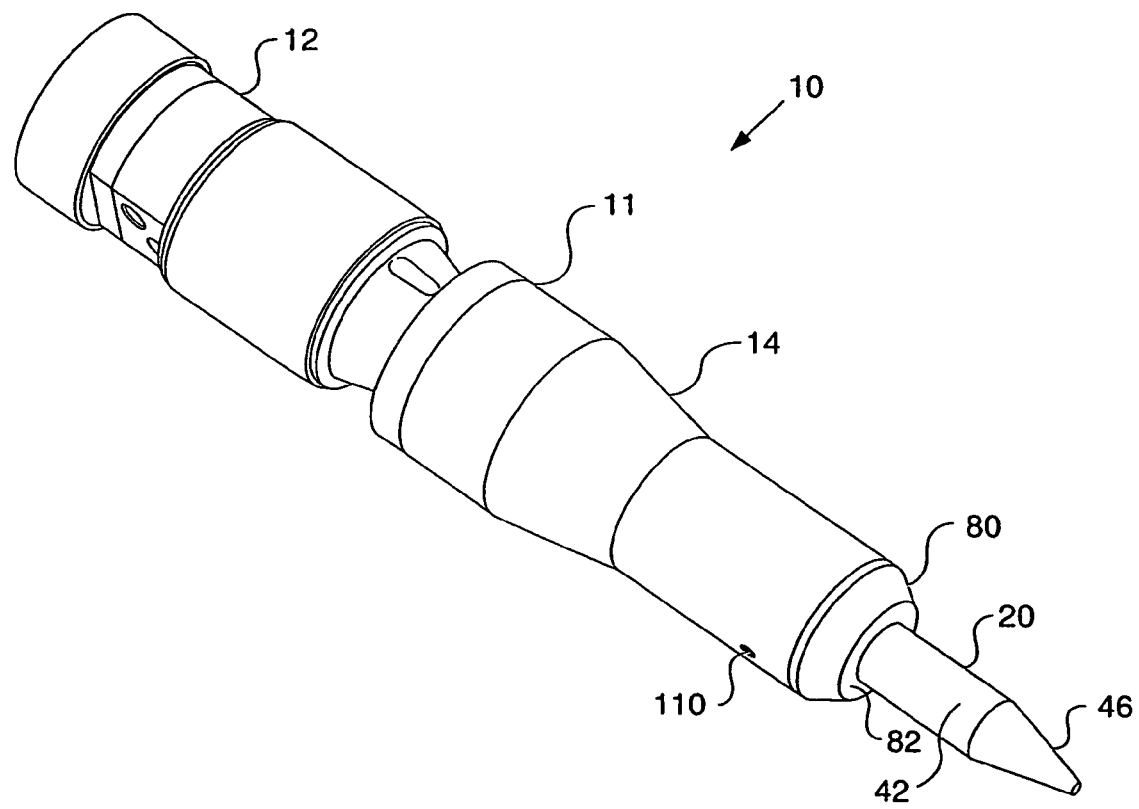
FIG. 1 is a perspective view of a hammer assembly according to one disclosed embodiment.
Figure 2:
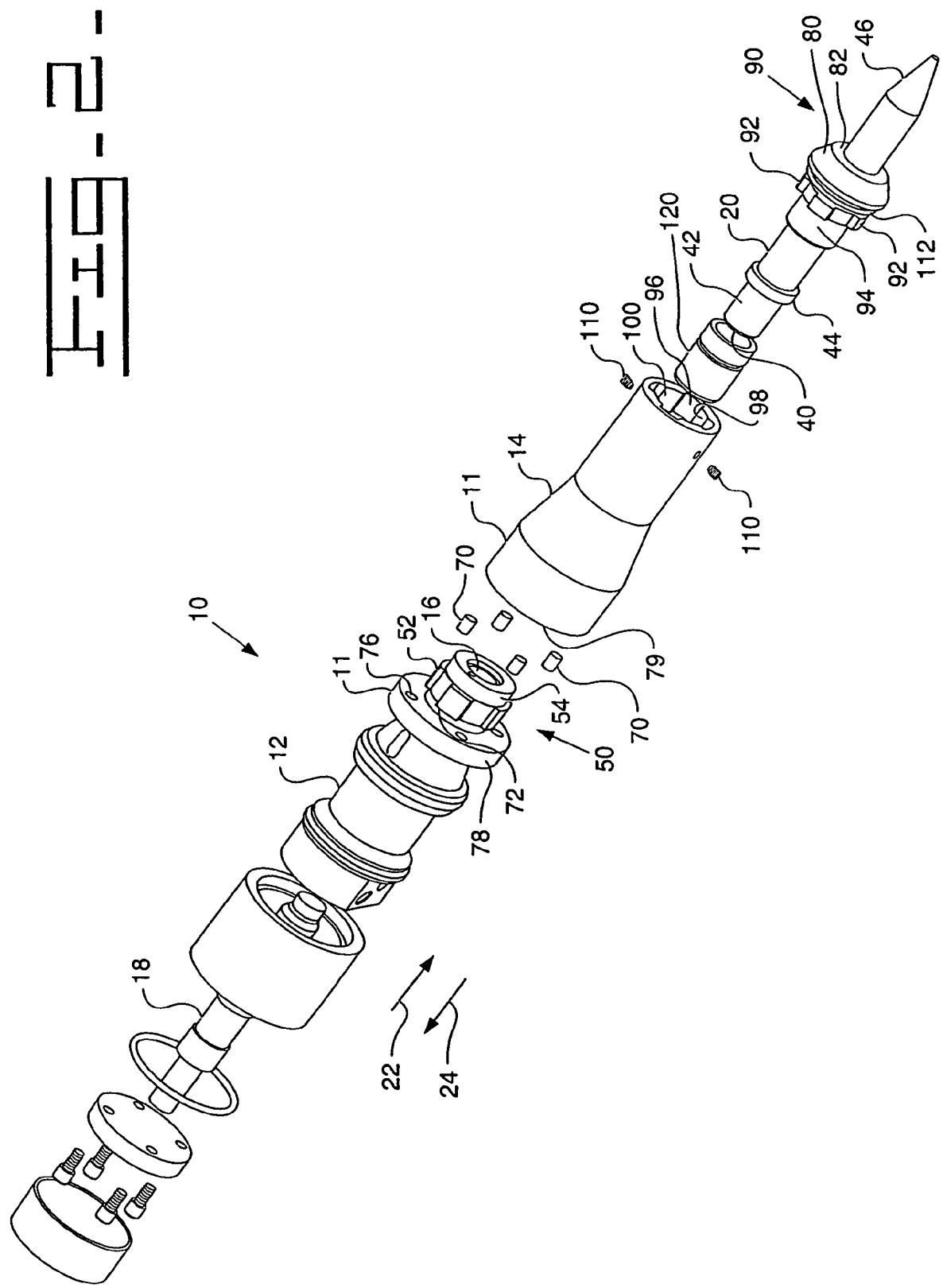
FIG. 2 is an exploded view of the hammer assembly of FIG. 1.
Figure 3:
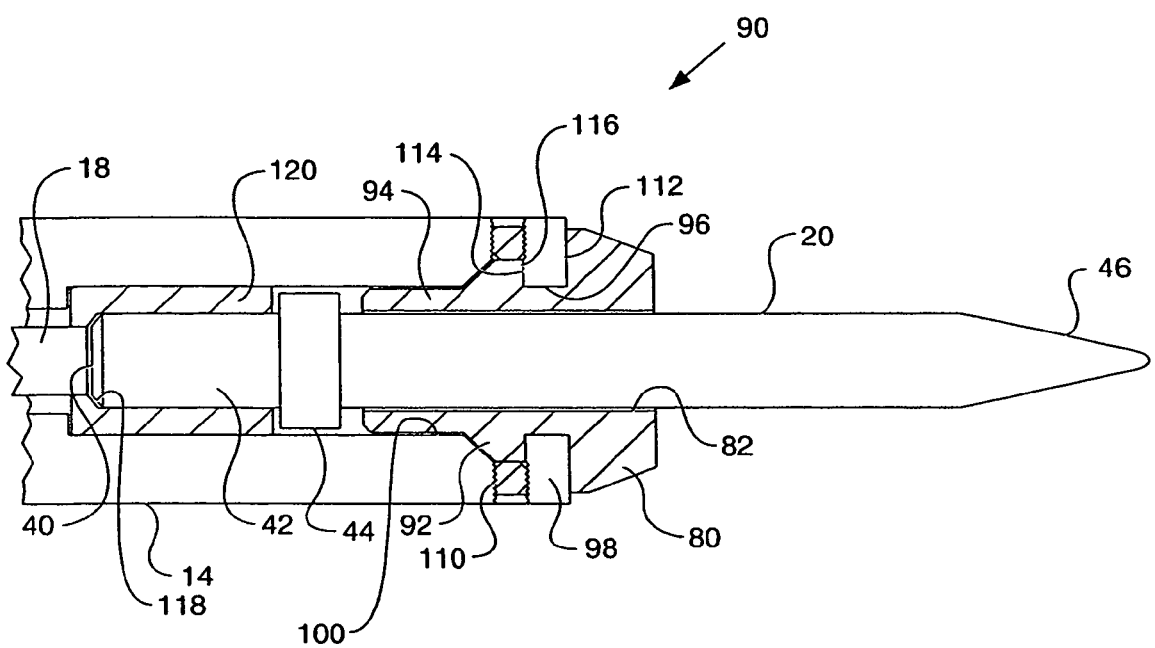
FIG. 3 shows a longitudinal section of the front head and work tool of the hammer assembly of FIG. 1.

With reference to FIGS. 1 to 3 there is shown a tool assembly 10, specifically a hydraulic hammer assembly, which may be attached to a backhoe or excavator (not shown). The tool assembly 10 includes a housing 11, a chamber 16 defined in the housing 11, a piston 18 and a work tool 20. The housing 11 is a two part housing including an upper housing member 12 and a lower housing member 14, often referred to as a front head, which define an upper and lower chamber respectively, which together make up the chamber 16. The piston 18 is operatively housed in the chamber 16 such that the piston 18 can translate in the general direction of arrows 22 and 24. In particular, during a work stroke, the piston 18 moves in the general direction of arrow 22 so as to strike the work tool 20. Conversely, during a return stroke, the piston 18 moves in the general direction of arrow 24.

A hydraulic circuit (not shown) provides pressurized fluid to urge the piston 18 towards the work tool 20 during the work stroke and to return the piston 18 during the return stroke. The hydraulic circuit is not described further, since it will be apparent to the skilled person that any suitable hydraulic arrangement may be used to provide pressurized fluid to the piston 18, such as the arrangement described in U.S. Pat. No. 5,944,120.

Near the end of the work stroke, the piston 18 strikes the upper end 40 of the work tool 20. The work tool 20 includes a shaft 42, a retaining flange 44 and a tip 46. The shaft 42 passes through a tool retention member 80 in the form of a bushing with a central aperture 82. The aperture 82 has a diameter smaller than that of the retaining flange 44 and thereby limits the movement of the work tool 20 in the general direction of arrow 22. In a variation of the disclosure, instead of the retaining flange 44, the tool retention structure can comprise a portion of the work tool of any other suitable shape having a lateral size greater than that of the aperture 82 of the tool retention member 80.

The tool retention member 80 can be removed from the housing 11, as described below, to allow a variety of work tools 20 with different configurations of the tip 46 to be attached to the tool assembly 10. As the piston 18 strikes the work tool 20, the force of the piston 18 is transmitted through the work tool 20 to the tip 46 in the general direction of arrow 22. Moreover, this force is applied to a hard object such as rock, concrete, or asphalt in order to break up the hard object.

The upper and lower housing members 12, 14 are connected by a housing engaging structure 50. In the illustrated embodiment the housing engaging structure 50 includes, for example, four lugs 52 provided equidistantly about the circumference of a plug portion 54 of the upper housing member 12. These are shaped such that as the plug portion 54 is inserted into the lower housing member 14 the lugs 52 can pass between four projections (not shown), for example, formed on the internal wall of the socket portion 56. The upper housing member 12 is then rotated by, for example, 45 degrees relative to the lower housing member 14 so that the lugs 52 engage beneath the projections 58.

Prestressing structure in the form of four jacking screws 70 are provided to urge the upwardly facing mating surfaces 72 of the lugs 52 against corresponding downwardly facing mating surfaces provided on the projections formed on the internal wall of the socket portion 56. The screws 70 engage in threaded apertures 76 provided equidistantly around the perimeter of a circular flange 78 of the upper housing member 12. The jacking screws 70 engage with an upwardly facing bearing surface 79 formed on the upper end of the lower housing member 14.

The tool retention member 80 and the housing 11 are connected by an engaging structure 90. In the illustrated embodiment the engagement structure 90 includes four lugs 92 provided equidistantly about the circumference of a plug portion 94 of the tool retention member 80. These are shaped such that as the plug portion 94 is inserted into a socket portion 96 of the lower housing member 14 the lugs 92 can pass between four projections 98 formed on the internal wall 100 of the socket portion 96. The tool retention member 80 is then rotated relative to the lower housing member 14 so that the lugs 92 engage beneath the projections 98. It is to be understood that other forms of mutually engaging protrusions may be envisaged, and the shape and number of lugs and protrusions can be varied and are not limited to those shown in the figures. A stop (not illustrated) may be formed on the internal wall 100 of the socket portion 96 such that upon rotation of the tool retention member 80 one of the lugs 92 comes into contact with the stop to indicate that sufficient rotation has taken place.

Locking structure in the form of two set screws 110 are provided in apertures in the housing 11. These engage with the plug portion 94 of the tool retention member 80 and prevent relative rotation of the tool retention member 80 and housing 11. However, any other suitable locking structure may be provided, and the locking structure may be omitted if required.

Prestressing structure in the form of a resilient seal ring 112 are provided to urge the first mating surfaces 114 of the projections 98 on the housing 11 against the second mating surfaces 116 of the lugs 92 on the tool retention member 80.

Movement of the tool 20 in the direction of arrow 22 is limited by the impact of the retaining flange 44 with the lower bushing or tool retention member 80, while movement of the tool 20 in the direction of arrow 24 is limited by the impact of the top of the tool 40 with a shoulder 118 of a cylindrical tool stop 120 which in turn engages with the lower housing member 14.

Although the disclosed embodiments have been described with reference to lugs and projections, it is to be understood that other forms of mutually engaging protrusions may be provided. For example the second mating surface on the tool retention member 80 may be provided on a helical protrusion which forms a male thread and engages with the first mating surface of a corresponding helical protrusion on the housing 11, serving as a female thread. In another example the engaging means may be a bayonet coupling in which two or more pins are provided on the plug portion 94 of the tool retention member 80, the pins engaging with two or more L-shaped slots provided on the internal surface of the socket portion 96.

Although the disclosed embodiments have been described with reference to the plug portion 94 formed on the tool retention member 80 and the socket portion 96 formed on the housing 11, the engaging structure may be reversed, so that the plug portion is formed on the housing 11 and the socket portion is formed on the tool retention member 80.

Although the prestressing structure described above comprises a resilient seal ring 112, other prestressing structure may be used, such as springs or other resilient elements which urge the tool retention member 80 and housing 11 apart. In the case of corresponding helical protrusions on the tool retention member 80 and housing 11 the prestressing structure may be the elastic or plastic deformation of the threads under a tightening torque on the housing members.

INDUSTRIAL APPLICABILITY

To remove a work tool 20, the set screws 110 or other locking structure are first loosened, and the tool retention member 80 rotated through, for example, 45 degrees, until the lugs 92 are aligned with the clearance sections between the projections 98 on the internal wall 100 of the socket portion 96 of the housing 11. The tool retention member 80 and tool 20 can then be removed from the housing 11 in the direction of arrow 22. To replace a work tool 20, the process is reversed.

Although the disclosed embodiments have been described with reference to a hammer assembly in which the tool is driven by a hydraulically actuated piston, the disclosed embodiments are applicable to any tool assembly having a reciprocating work tool movable within a chamber by suitable drive structure and/or return structure. The disclosed embodiments encompass pneumatic tools and other impact tools.

At least some of the disclosed embodiments may eliminate the need for a retainer pin, which eliminates a dust entry path and simplifies the process of tool replacement, since the need to remove burring from the pin or tool is eliminated. Furthermore, stress concentration at the point of contact with the pin may be avoided, since the tool retention member allows a more even distribution of stress.

At least some of the disclosed embodiments may allow the work tool to rotate, unlike the prior art retainer pin, providing more even wear of the work tool and increased tool life. If particular circumstances require that the tool should not be able to rotate, the tool retaining flange 44 can include longitudinal keys (not shown) which engage with longitudinal grooves (not shown) in the internal wall 100 of the housing 11.

While the disclosed embodiments have been illustrated and described in detail in the drawings and foregoing description, such illustration and description is to be considered as exemplary and not restrictive in character, it being understood that only exemplary embodiments have been shown and described and that all changes and modifications that come within the spirit of the disclosure are desired to be protected.

What is claimed is:

1. A tool assembly, comprising:
a housing defining a chamber;
a reciprocating work tool arranged in the chamber;
a tool retention member having an aperture through which the work tool extends;
engaging structure including mutually engaging protrusions on the housing and the tool retention member configured to permit engagement of the tool retention member with the housing by relative rotation of the tool retention member and the housing;

retention structure on the work tool configured to prevent removal of the work tool from the housing when the tool retention member is engaged with the housing;

a locking structure configured to lock the tool retention member and housing against relative rotation; and a prestressing structure located between the protrusions on the housing and a portion of the tool retention member and configured to urge the tool retention member away from the housing.

2. The tool assembly according to claim 1, wherein the mutually engaging protrusions on the housing and the tool retention member include a plurality of spaced lugs on the tool retention member and a plurality of spaced projections on the housing.

3. The tool assembly according to claim 2, wherein the prestressing structure is configured to urge the spaced lugs on the tool retention member against the plurality of spaced projections on the housing.

4. The tool assembly according to claim 1, wherein the retention structure includes a flange on the work tool having a size greater than the aperture of the tool retention member.

5. The tool assembly according to claim 1, wherein the prestressing structure includes a resilient seal ring.

6. The tool assembly according to claim 1, wherein the tool retention member includes a bushing, and wherein the aperture is a central aperture in the bushing.

7. The tool assembly according to claim 6, wherein the bushing includes a plug portion configured to be inserted into a socket portion of the housing.

8. The tool assembly according to claim 7, wherein the mutually engaging protrusions on the housing and the tool retention member include lugs spaced about a circumference of the plug portion.

9. The tool assembly according to claim 8, wherein the mutually engaging protrusions on the housing and the tool retention member further include projections formed on an internal wall of the socket portion.

10. The tool assembly according to claim 6, wherein the housing includes an upper housing portion and a lower housing portion, and wherein the socket portion is in the lower housing portion.

11. A hydraulic hammer including a tool assembly, the tool assembly comprising:

a housing defining a chamber;

a reciprocating work tool arranged in the chamber;

a tool retention member having an aperture through which the work tool extends;

engaging structure including a plurality of mutually engaging spaced lugs on the tool retention member and spaced projections on the housing, the lugs being configured to pass between the projections in a substantially longitudinal direction of the tool retention member, the engaging structure being configured to permit engagement of the tool retention member with the housing by relative rotation of the tool retention member and the housing;

retention structure on the work tool configured to prevent removal of the work tool from the housing when the tool retention member is engaged with the housing; and a resilient seal ring located between the housing and a portion of the tool retention member.

12. The hydraulic hammer according to claim 11, wherein the resilient seal ring is configured to urge the spaced lugs on the tool retention member against the plurality of spaced projections on the housing.

13. The hydraulic hammer according to claim 11, wherein the tool retention member includes a bushing, and wherein the aperture is a central aperture in the bushing.

14. The hydraulic hammer according to claim 13, wherein the bushing includes a plug portion configured to be inserted into a socket portion of the housing.

15. The hydraulic hammer according to claim 14, wherein the mutually engaging spaced lugs on the tool retention member, and spaced projections on the housing include four lugs spaced equidistantly about a circumference of the plug portion.

16. The hydraulic hammer according to claim 15, wherein the mutually engaging protrusions on the housing and the tool retention member further include four projections formed on an internal wall of the socket portion.

17. The hydraulic hammer according to claim 11, further including a locking structure configured to lock the tool retention member and housing against relative rotation.

18. A method of installing a work tool in a tool assembly, the tool assembly including a housing defining a chamber, and a tool retention member having an aperture, the method comprising:

inserting a work tool in the aperture of the tool retention member;

securing the work tool for reciprocating movement within the chamber by relatively rotating the tool retention member and the housing to engage protrusions on the housing with protrusions on the tool retention member;

prestressing the tool retention member relative to the housing by urging the tool retention member away from the housing and urging the protrusion on the housing against the protrusions on the tool retention member; and locking the tool retention member and housing against relative rotation.

19. The method of claim 18, wherein prestressing the tool retention member relative to the housing includes locating a resilient seal ring between the housing and a portion of the tool retention member.

20. The method of claim 18, wherein the tool retention member includes a bushing including a plug portion, and wherein securing the work tool includes inserting the plug portion of the bushing into a socket portion of the housing.

* * * * *